United States Patent [19]
Piatkowski et al.

[11] 3,722,302
[45] Mar. 27, 1973

[54] DRIVE HAVING IMBALANCED ROTATABLE SHAFTS

[75] Inventors: Paul Piatkowski, Kiel; Manfred Birkholz, Schonkirchen, Uber Kiel, both of Germany

[73] Assignee: Maschinenfabrik Buckau R. Wolf Aktiengesellschaft, Grevenbroich, Germany

[22] Filed: Aug. 18, 1971

[21] Appl. No.: 172,726

[30] Foreign Application Priority Data

Oct. 23, 1970  Germany.....................P 20 52 036.9

[52] U.S. Cl. ..........................74/61, 94/48, 209/367
[51] Int. Cl............................................F16h 33/20
[58] Field of Search...............74/87, 61; 94/48, 50 V; 209/366.5, 367; 259/DIG. 42

[56] References Cited

UNITED STATES PATENTS

| | | | |
|---|---|---|---|
| 1,917,972 | 5/1931 | Henriot | 188/290 |
| 3,505,885 | 4/1970 | Waschulewski et al. | 74/61 |

*Primary Examiner*—Milton Kaufman
*Attorney*—Michael S. Striker

[57] ABSTRACT

A housing accommodates a body of liquid and two imbalanced shafts which are journalled for rotation. One gear is mounted on one of the shafts for rotation therewith and another gear meshing with it is mounted on the other shaft for rotation relative thereto. A coupling arrangement is fast with the other shaft and normally engages with the gear thereon so that the shaft turns with the gear, but can be disengaged when the shaft reaches a certain angular position. Projections provided on the circumference of the shaft and entering into the body of liquid will quickly brake the rotation of the shaft when the latter becomes disconnected from its associated gear.

6 Claims, 2 Drawing Figures

3,722,302

DRIVE HAVING IMBALANCED ROTATABLE SHAFTS

BACKGROUND OF THE INVENTION

The present invention relates generally to a drive having imbalanced rotatable shafts, and more particularly to a drive with a switching arrangement of the type in question, especially for use in vibratory plate compactors.

Vibratory plate compactors are already known, and it will be remembered by those conversant with the art that they utilize drives having imbalanced shafts or masses in which two imbalanced shafts are arranged and coupled for joint rotation by suitable gears. By means of a mechanical or other switching arrangement one of the imbalanced shafts can be varied in its phase location during the operation with reference to the other shaft. Such a variance of the position of the shaft is for instance effected by mounting the gear associated with the shaft so that it can rotate with reference to the latter, and to provide a coupling arrangement by means of which the shaft can be coupled with the gear so that they can rotate with one another, or can be uncoupled from the gear so that the gear rotates with reference to the shaft. Thus, during each switching operation with such a device, a certain relative angular displacement of the imbalance with reference to the driving gear is achieved. It is also known to provide vibratory blade plate compactors in which two of such drives are provided and arranged adjacent one another, so that it is possible to move the compactor not only forwards and backwards but by utilizing only one of the drives at a time to move it in a corresponding curve.

While this latter type of arrangement is advantageous in some ways, in particular because of the greater versatility of movement which it can perform, the use of two adjacent imbalanced drives brings with it the disadvantage that under certain disadvantageous ground surface characteristics sometimes the frequency imposed on the vibratory plate by the non-switched imbalanced drive may prevent the relative angular displacement of the one imbalance with reference to the drive, so that the desired change in the direction of movement is not achieved. This is also aided by the fact that the ground over which the vibratory plate compactor moves reflects energy at the same frequency as that which is imposed upon the vibratory plate itself. Attempts have been made to overcome these difficulties. Thus, it is known in the art to provide mechanical, hydraulic or electromagnetically operated brakes which are utilized to impose the desired relative angular displacement of the imbalance with reference to the drive. However, these constructions are very expensive and complicated, and especially when one considers that they are used in a device subjected to vibrations, it will be appreciated that they are susceptible to damage and malfunction.

SUMMARY OF THE INVENTION

It is, thus, a general object of the present invention to avoid the disadvantages of the prior are.

More particularly it is an object of the present invention to provide an apparatus of the type under discussion in which the relative angular displacement of the imbalance with reference to the driving gear is achieved in that the imbalance is subjected to a constant but slight braking moment which, when the imbalance becomes disconnected from the drive, will necessarily cause a retardation in the turning movement of the imbalance and thus achieve the desired effect.

In pursuance of the above objects, and of others which will become apparent hereafter, one feature of an apparatus according to the present invention comprises the provision of a housing and a body of liquid accommodated in the housing. At least two imbalanced shafts are journalled for rotation in the housing and gear means is provided which is driven by one of the shafts. Coupling means is provided on the other of the shafts and engages the gear means, being operative for disengaging from the gear means when the other shaft is in a predetermined angular position. Projections provided on the circumference of the other shaft are adapted to enter into the body of liquid at least when the other shaft is in the aforementioned angular position to thereby brake the rotation of the other shaft upon disengaging of the coupling means from the gear means. Ordinarily, of course, at least some of these projections will be constantly immersed in the liquid, usually oil, and will thus exert a constant retarding or braking moment upon the imbalance or shaft which is provided with them. With respect to the known pure brakes, that is brakes which act to obtain a retardation moment only during the switching activity according to the prior art, the construction according to the present invention achieves a constant contact of the coupling portion so that a further advantage obtained is that an undesired self-activated switching of the imbalance is avoided. Furthermore, no special energy source is required for obtaining this required retardation effect, and the arrangement is completely free of maintenance. Finally, the construction according to the present invention is also substantially simpler than those known from the prior art and, of course, less expensive.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
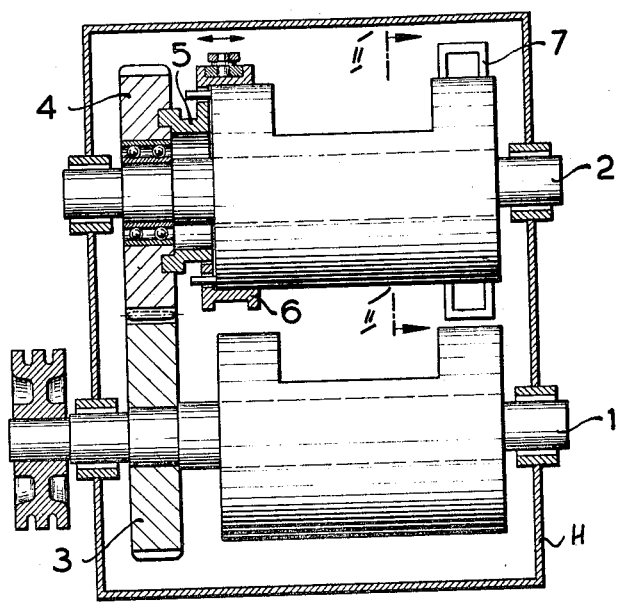
FIG. 1 is an axial section through an arrangement embodying the present invention.
Figure 2:
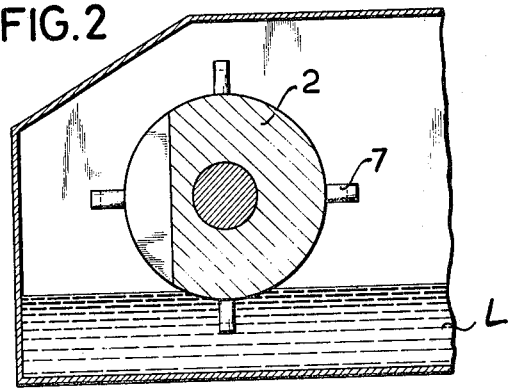
FIG. 2 is a fragmentary section taken on line II—II of FIG. 1.

Discussing now the drawing in detail it will be seen that in the exemplary illustrated embodiment a housing H has journalled in it a pair of imbalanced shafts 1 and 2 which are rotatable. A gear 3 is mounted on the shaft 1 for rotation therewith, and the shaft 1 may be driven by a suitable known drive whose construction forms no part of the present invention. A second gear 4 is mounted on the shaft 2, but not fixed therewith. Instead, the gear 4 is turnable on the shaft 2 with reference thereto. A claw-coupling 5 on the shaft 2 normally engages the gear 4 so that when the latter is driven by the gear 3 with which is meshes, it will in turn drive the shaft 2 in rotation. A switching or engaging ring 6, however, permits disengagement of the coupling 5 from the gear 4 when the shaft 2 assumes a certain angular position. How this is done is also known from the art.

The shaft 2 is provided, in accordance with the present invention, with a plurality of circumferentially distributed projections 7, in form of vanes, blades or the like, which enter during rotation of the shaft 2 into the body of liquid L (usually oil) accommodated in the housing H, and which thus exert upon the shaft 2 a braking or retarding movement, which assures that a relative angular displacement of the shaft 2 with reference to the shaft 1 will take place within a short period of time after the shaft 2 is disengaged from its gear 4. At the same time, the presence of these projections 7, some of which in the illustrated embodiment will always enter into and be retarded by the body of liquid L, exerts a slight but constant retarding moment upon the shaft 2 and thus assures that the projections of the claw type coupling 5 and of the switching ring 6 will remain in engagement to prevent undesired switching operations.

It will be understood that each of the elements described above, or two or more together, may also find a useful application in other types of constructions differing from the types described above.

While the invention has been illustrated and described as embodied in a specific embodiment, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An apparatus of the character described, comprising, a housing; a body of liquid accommodated in said housing; at least two imbalanced shafts journalled for rotation in said housing; gear means driven by one of said shafts; coupling means on the other of said shafts engaging said gear means and the other of said shafts and operative for disengaging from said gear means when said other shaft is in a predetermined angular position; and projections provided on the circumference of said other shaft adapted to enter into said body of liquid at least when said other shaft is in said angular position to thereby brake the rotation of said other shaft in automatic response to disengaging of said coupling means from said gear means.

2. An apparatus as defined in claim 1, wherein said projections are vanes.

3. An apparatus as defined in claim 1, wherein said projections are blades.

4. An apparatus as defined in claim 1, wherein said gear means comprises at least two meshing gears one of which is fast with said one shaft and the other of which is journalled on said other shaft with freedom of rotation relative thereto.

5. An apparatus as defined in claim 4, said coupling means comprising a coupling element fast with said other shaft for rotation therewith, and being movable axially of said other shaft between two positions in one of which it engages and in the other of which it disengages from said other gear.

6. An apparatus as defined in claim 1, wherein said liquid is oil.

* * * * *